United States Patent [19]

Julius

[11] Patent Number: 4,887,798
[45] Date of Patent: Dec. 19, 1989

[54] DEVICE FOR DETECTING SLAG FLOWING WITH MOLTEN METAL THROUGH AN OUTLET OPENING IN A METALLURGICAL VESSEL

[75] Inventor: Edmund Julius, Aachen, Fed. Rep. of Germany

[73] Assignee: AMEPA Angewandte Messtechnik und Prozessautomatisierung GmbH, Aachen, Fed. Rep. of Germany

[21] Appl. No.: 215,582

[22] Filed: Jul. 5, 1988

[30] Foreign Application Priority Data

Jul. 10, 1987 [DE] Fed. Rep. of Germany ....... 3722795

[51] Int. Cl.$^4$ .............................................. C21B 7/24
[52] U.S. Cl. ...................................... 266/99; 266/227
[58] Field of Search ................... 266/99, 236, 45, 227, 266/78, 93, 94

[56] References Cited

U.S. PATENT DOCUMENTS 4,140,300 2/1979 Gruner et al. ...................... 266/45
4,602,768 7/1986 Tinnes et al. ..................... 266/236

Primary Examiner—S. Kastler
Attorney, Agent, or Firm—Wenderoth, Lind & Ponack

[57] ABSTRACT

A device for detecting slag flowing with a stream of molten metal discharged through an outlet opening in a metallurgical vessel includes a sensor positioned in the area of a base plate of the vessel to surround the stream of molten metal without being contacted thereby. The sensor has a sending coil and a receiving coil associated with a reference coil. At least the sending and receiving coils are positioned within a housing formed of a non-magnetic material. The housing encompasses the coils and defines therearound a protective casing that alters electromagnetic fields emanating from the base plate and the stream of molten metal and that is resistant to mechanical stresses.

16 Claims, 2 Drawing Sheets

DEVICE FOR DETECTING SLAG FLOWING WITH MOLTEN METAL THROUGH AN OUTLET OPENING IN A METALLURGICAL VESSEL

BACKGROUND OF THE INVENTION

The present invention relates to a device for detecting slag flowing with molten metal through an outlet opening in a metallurgical vessel. More particularly, the present invention relates to such a device including a sensor positioned in the area of a metal base plate or outer shell or housing of the metallurgical vessel. The base plate has therethrough a discharge aperture, and the sensor is positioned such that it surrounds the discharged stream of molten metal without making contact therewith. The sensor is of the type including a sending coil and a receiving coil associated with a reference coil.

This type of device is disclosed in DE-OS No. 34 39 369, wherein the sensor is built into the nozzle brick or the brick lining of the metallurgical vessel. Because of high signal amplitude as well as a high signal-interference ratio, this sensor makes it possible to discern and indicate very small proportions of slag in the flowing stream of molten metal, without having to remove the shield that protects the stream of molten metal or hindering a casting operation involving the discharge of molten metal.

However, one disadvantage of this known device results from the position of the sensor in the nozzle brick or the brick lining of the vessel. Thus, these elements of the vessel must be changed frequently. This however makes it impossible to reuse the sensor, even though the sensor itself still probably is operable.

Furthermore, if the sensor is positioned on or in the base plate of the metallurgical vessel, the signal amplitudes are sharply reduced by the metal shield and by the metal base of the vessel. In addition, with this arrangement the temperature changes of the ferromagnetic metal components in the vicinity of the sensor alter the permeability of the components of the sensor. This results in the generation of strong signal drifts, which could simulate the occurence of slag in the stream of molten metal.

SUMMARY OF THE INVENTION

Accordingly, it is an object of the present invention to provide an improved sensor of the above type, but whereby the sensor has a much longer service life that is in no way affected by necessary changes and replacements of the nozzle brick and brick lining of the vessel, and whereby signal drift due to temperature changes in the ferromagnetic material of the base plate of the metallurgical vessel, which can create measurement problems, is significantly reduced.

The above object is achieved in accordance with the present invention by the provision that at least the sending and receiving coils of the sensor are positioned within a cassette or housing formed of a non-magnetic material. The housing encompasses the coils and defines therearound a protective casing that alters electromagnetic fields emanating from the base plate and from the stream of molten metal and that is resistant to mechanical stresses. In a particularly preferred arrangement, the coils are embedded in ceramic material that fills the housing, the ceramic material not rigidly mounting the coils within the housing, but rather allowing expansion and contraction of the coils within the housing. The reference coil also may be positioned within the housing, whereby a partition within the housing separates the reference coil from the sending and receiving coils, and an inner wall lining shields the reference coil. Alternatively, the reference coil may be positioned exteriorly of the metallurgical vessel, and the housing may include an inner wall lining shielding the sending and receiving coils from the base plate. The housing may be positioned on the top side of the base plate and within the bottom side of the nozzle brick of the metallurgical vessel. Alternatively, the housing may be concentrically positioned within an aperture through the base plate, thereby providing a particularly easy assembly operation. The housing may define a conduit for a discharge sleeve of the metallurgical vessel. The housing also may be integrated into a centering ring for the nozzle brick of the metallurgical vessel. In accordance with the present invention, the sensor and the encompassing housing can be reused independently of replacement of the nozzle brick or the brick lining of the metallurgical vessel.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
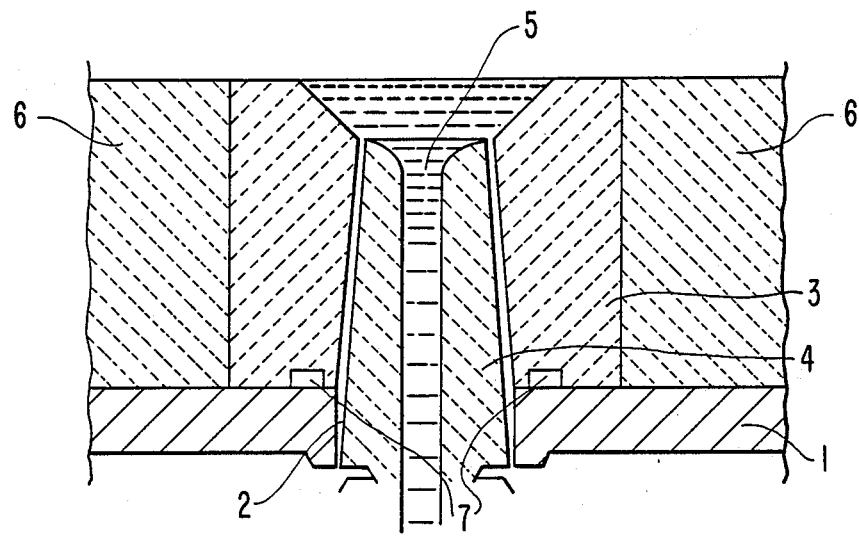
FIG. 1 is a vertical cross sectional view through the bottom portion of a metallurgical vessel including a device according to the present invention.

FIG. 1 shows a portion of the bottom of a metallurgical vessel including a metal base plate or shell 1 having therethrough an aperture 2 and a refractory brick lining 6. Coaxial to aperture 2 is a nozzle brick 3 within lining 6 and positioned on the top of base plate 1. An inner discharge sleeve 4 is positioned within nozzle brick 3 and has therethrough a discharge opening through which flows a discharged stream of molten metal 5.

On the top side of base plate 1 is positioned an annular cassette or housing 7 surrounding a discharged stream of molten metal without coming into contact therewith. Housing 7 may be positioned within an annular slot formed in the bottom surface of nozzle brick 3. By this arrangement it is possible for the nozzle brick 3 to be centered and fixed in position.

Figure 2:
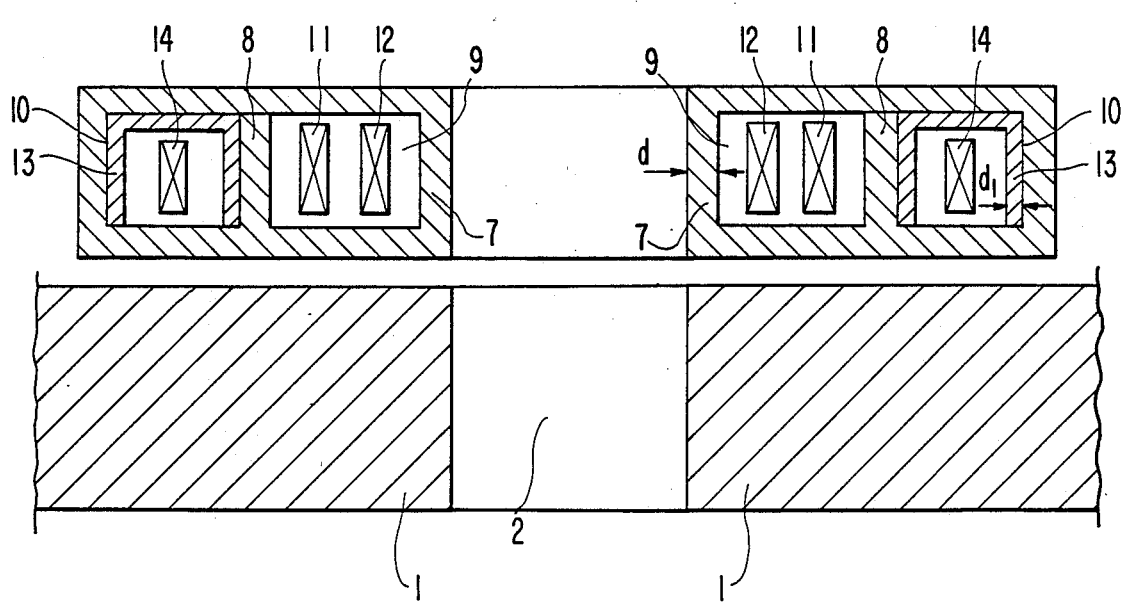
FIG. 2 is a vertical cross section, on an enlarged scale and shown somewhat schematically, of the device of FIG. 1 shown in the top side of a base plate of the metallurgical vessel.

As shown in FIG. 2, the housing 7 that is positioned on base plate 1 is divided by an annular wall 8 into two concentric annular chambers 9, 10. Within inner chamber 9 are positioned a sending coil 11 and a receiving coil 12. Within chamber 10 is positioned a reference coil 14, and an additional inner wall lining 13 shields reference coil 14.

By positioning the sending and receiving coils of the sensor within a non-magnetic housing in accordance with the present invention, the sensor can be positioned on or in the base plate of the metallurgical vessel. Also, due to the design of the housing, the sensor can be protected against mechanical stresses and electromagnetic fields can be altered so that changes in the permeability of the base plate will have only a slight effect on measured signals.

According to one arrangement of the present invention, the coils are embedded in a ceramic material 9 which fills the housing. With such ceramic material incorporated into the housing, in powder or fiber form for example, the coils can be safely positioned within the housing without preventing the coils from the necessary repeated expansion and contraction thereof. If the coils were rigidly mounted to not allow such expansion and contraction, then the coils would be damaged. The ceramic powder or fiber material is not specifically illustrated, but one of ordinary skill in the art would understand what ceramic materials could be used and how such material could be provided with the coils embedded therein.

Figure 3:
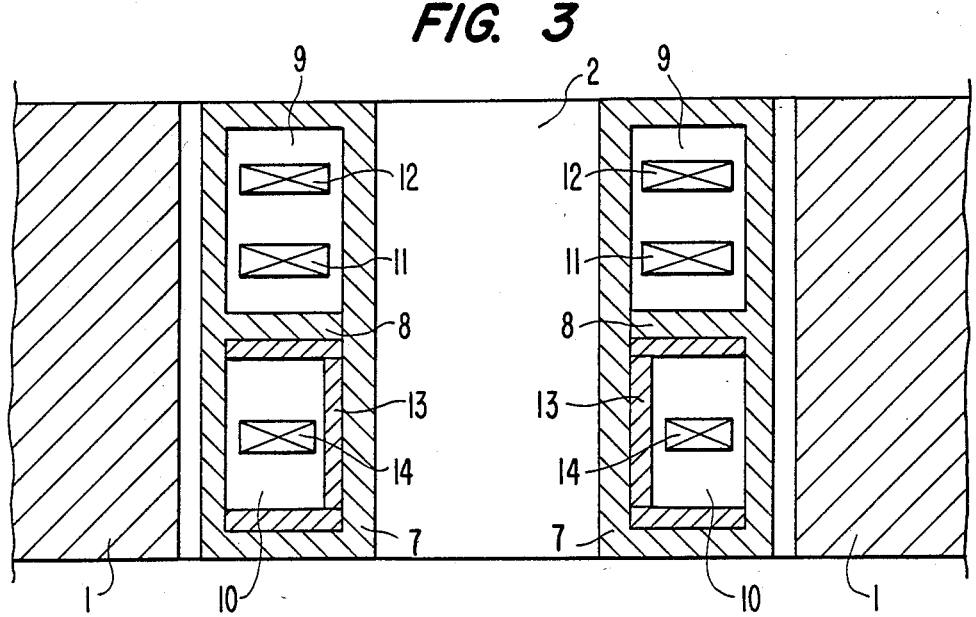
FIG. 3 is a view similar to FIG. 2 but showing an embodiment wherein the device of the present invention is set within an aperture through the base plate.

Although the reference coil could be provided outside of the housing, in a manner to be discussed in more detail below with regard to FIGS. 4 and 5, the embodiments of FIGS. 2 and 3 provide the reference coil within the housing, the reference coil being separated from the sending and receiving coils by partition 8 and shielded by additional wall lining or wall reinforcement 13. This configuration provides improved drift suppression, since both the receiving and reference coils are subjected to the same temperatures.

Figure 4:
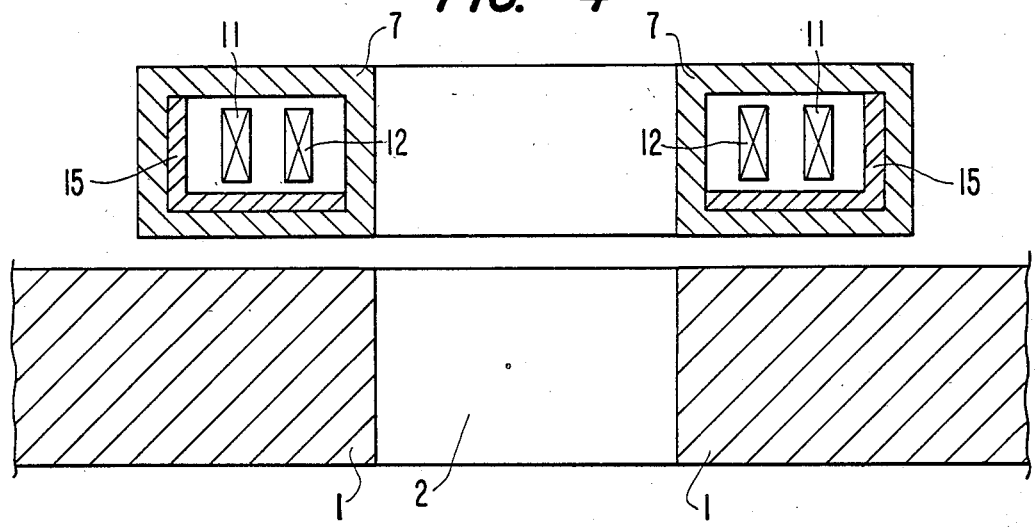
FIGS. 4 and 5 are views similar to FIGS. 2 and 3, respectively, but showing a device without an integral reference coil, the reference coil being positioned externally.
Figure 5:
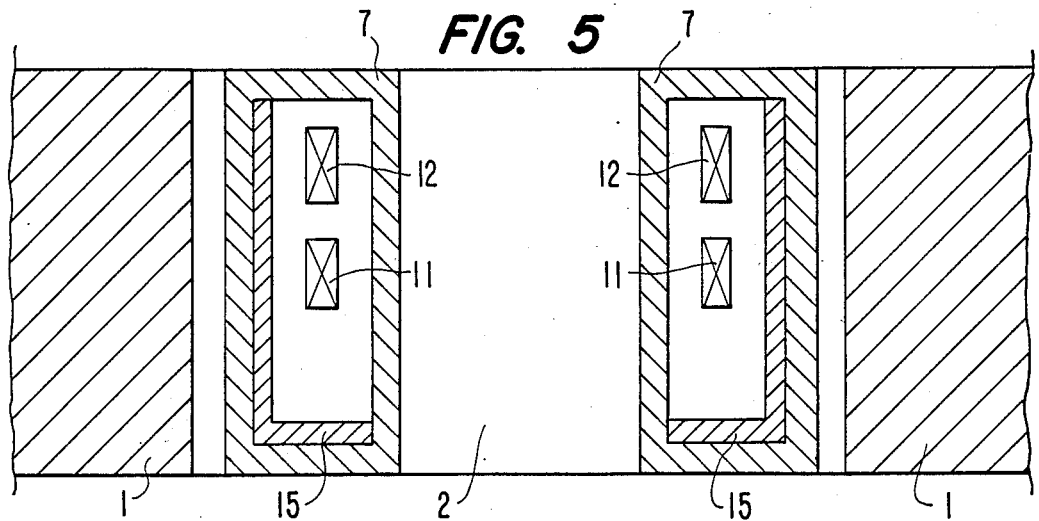

In the embodiments of FIGS. 4 and 5, depending on particular requirements, it may be worthwhile to shield the sending and receiving coils by a common additional wall lining or wall reinforcement.

Because of the encapsulation of the coils according to the present invention, it is possible to provide various specific arrangements of the device. According to the embodiments of FIGS. 2 and 4, it particularly is advantageous to provide the housing on the top side of the base plate and positioned within or set into the bottom side of the nozzle brick. In the embodiments of FIGS. 3 and 5, the housing is provided as a concentric ring into the discharge aperture of the base plate.

The device of the present invention, illustrated in FIG. 2, operates in the following manner. Alternating current of specific frequencies is fed into sending coil 11. This current induces eddy currents in the molten metal 5 and in base plate 1, whose fields cause induced electromotive forces in both receiving coil 12 and reference coil 14. Because of the particular geometric design of housing 7, particularly the additional wall lining 13 of an electrically conductive material, the electromagnetic fields emanating from the molten metal 5 are largely kept away from reference coil 14, while due to the symmetry of the base of housing 7 the electromagnetic fields emanating from the base plate 1 have practically the same effect on both coils 12, 14. Due to an in phase subtraction of the induced electromotive forces from reference coil 14 and receiving coil 12, the field changes caused by the permeability changes in base plate 1 can be compensated.

The wall strength of housing 7 preferably is chosen such that:

$$d \ll \delta,$$

where $$\delta = \sqrt{\frac{2}{\omega \kappa \mu}}$$

and
$\delta$ = penetration depth
$\kappa$ = electric conductivity of the wall
$\mu$ = permeability
$\omega = 2\pi f$ = angular frequency of the testing current In contrast to the arrangement shown in FIG. 2, the housing 7 in the embodiment of FIG. 3 is positioned, not on the top of base plate 1 of the metallurgical vessel, but rather as a concentric ring within aperture 2 of base plate 1. At the same time, housing 7 can assume the function of a conduit for receiving a discharge sleeve of the vessel, or can be integrated into an already existing centering ring thereof, etc. In this embodiment, the function is identical to the function discussed above regarding the embodiment of FIG. 2, with the exception that eddy currents are induced laterally in base plate 1. The reaction toward the receiving or measurement coil 12 and reference coil 14 is in principle the same as that for the embodiment of FIG. 2. The advantage of the embodiment of FIG. 3 is that the lining or nozzle brick of the metallurgical vessel does not have to be altered for receipt of the housing. There is no change in the metal base plate 1 if the discharge sleeve is adapted to the housing 7 which also can assume the function of a conduit for the sleeve. Also, the housing 7 readily can be exchanged externally from the bottom of the base plate 1, thus not requiring exchange of the nozzle brick or the vessel lining.

The embodiment of FIG. 4 is similar to that of FIG. 2, except that the reference coil 14 is not provided within the housing 7 but rather is positioned externally or is simulated electronically. This embodiment operates in the following manner. Thus, by feeding two frequencies into sending coil 11, eddy currents of different amplitudes and phase relations are induced in molten metal 5 and base plate 1. If the frequencies and thickness $d_1$ of an additional wall lining 15 are chosen such that the fields of the higher frequencies only slightly penetrate base plate 1, while those of low frequency clearly penetrate base plate 1, then the signals of the low frequencies contain primarily information regarding the change in temperature of the base plate 1, while the higher frequencies primarily contain information regarding molten metal stream 5. The thickness of additional wall lining 15 should thus be derived from:

$$\delta_1 \gg d_1 \text{ and } \delta_2 \ll d_1,$$

where $$\delta_{1,2} = \sqrt{\frac{2}{\omega_{1,2} \cdot \kappa_{1,2} \mu}},$$

where
$\omega 1$ = frequency of low measurement frequency
$\omega 2$ = frequency of high measurement frequency
$\kappa 1$ = electric conductivity of wall d
$\kappa 2$ = electric conductivity of additional wall lining $d_1$ The simultaneous evaluation of the signals of both frequencies thus makes it possible to largely separate the actuating variables "included slag" and temperature drifts, especially if adjustment of the frequencies and thickness $d_1$ has resulted in a situation in which the phase regulations of the signals and of the interference signals each differ by 90°.

In contrast to the arrangement of the embodiment of FIG. 4, the housing 7 in the embodiment of FIG. 5 is positioned, not on top of the base plate 1 of the metallurgical vessel, but rather, in a manner similar to that of the embodiment of FIG. 3, within aperture 2 of base plate 1. Housing 7 thus acts as a concentric ring within aperture 2. At the same time, housing 7 can provide the function of a conduit for receiving a discharge sleeve or can be integrated into an already existing centering ring, etc. The function of the embodiment of FIG. 5 is identical with the function of the embodiment of FIG. 4, with the exception that the eddy currents are induced laterally within base plate 1. The advantage of this embodiment is that the nozzle brick and brick lining of the vessel need not be exchanged upon exchange of the housing. No change is needed in base plate 1 if the discharge sleeve is adapted to the housing 7. Furthermore, the housing 7 can be changed externally from the bottom side of the base plate 1, independent of the need for changing the nozzle brick or the brick lining.

One skilled in the art would understand materials that could be used for housing 7 and partition 8 and for wall linings 13 and 15. Exemplary materials for elements 7 and 8 are non-magnetic steel, e.g. AISI No. 321,316Ti, and for elements 13 and 15 are non-magnetic steel, e.g. AISI No. 304,321, or copper or copper-zirconium alloys.

Although the present invention has been described and illustrated with respect to preferred embodiments of the present invention, it is to be understood that various changes and modifications may be made to the specifically described and illustrated features without departing from the scope of the present invention.

What is claimed is:

1. In a device for detecting slag flowing with a stream of molten metal discharged through an outlet opening in a metallurgical vessel, said device including a sensor for sensing slag in the stream of molten metal to be positioned in the area of a metal base plate of the metallurgical vessel and to surround the discharged stream of molten metal without being in contact therewith, said sensor having at least one sending coil and at least one receiving coil associated with a reference coil, the improvement wherein:
   at least said sending and receiving coils extend concentrically within a housing formed of a non-magnetic material, said housing encompassing said coils and defining therearound a protective casing that is resistant to mechanical stresses, and
   said housing includes means for preventing the metal plate from adversely affecting the sensing of the slag in the molten metal when the device is positioned in the area of the metal base plate of the vessel, said means comprising
   one of a shield shielding the reference coil from an electromagnetic field emanating from the stream of molten metal while exposing the reference coil to an electromagnetic field emanating from the metal plate, and a shield shielding the metal plate from high frequency signals issued by the sending coil while allowing low frequency signals issuing from the sending coil to penetrate the metal plate.

2. The improvement claimed in claim 1, wherein said coils are embedded in ceramic material filling said housing.

3. The improvement claimed in claim 1, wherein said sensor further comprises said reference coil positioned within said housing, a partition within said housing separating said reference coil from said sending and receiving coils, and an inner wall lining shielding said reference coil.

4. The improvement claimed in claim 1, wherein said housing is to be positioned on the top side of the base plate and within the bottom side of a nozzle brick of the metallurgical vessel.

5. The improvement claimed in claim 1, wherein said housing is to be concentrically positioned within an aperture through the base plate.

6. The improvement claimed in claim 5, wherein said housing defines a conduit for a discharge sleeve of the metallurgical vessel.

7. The improvement claimed in claim 5, wherein said housing is integrated into a centering ring for a nozzle brick of the metallurgical vessel.

8. In an assembly including a metallurgical vessel having a metal base plate and an outlet opening for discharging a stream of molten metal from said vessel, and a device for detecting slag flowing with the stream of molten metal, said device including a sensor for sensing slag in the stream of molten metal, said sensor positioned in the area of said metal base plate and surrounding the discharged stream of molten metal without being in contact therewith, and said sensor having at least one sending coil and at least one receiving coil associated with a reference coil, the improvement wherein:
   at least said sending and receiving coils extend concentrically within a housing formed of a non-magnetic material, said housing encompassing said coils and defining therearound a protective casing that is resistant to mechanical stresses, and
   said housing includes means for preventing the metal plate from adversely affecting the sensing of the slag in the molten metal, said means comprising
   one of a shield shielding the reference coil from an electromagnetic field emanating from the stream of molten metal while exposing the reference coil to an electromagnetic field emanating from the metal plate, and a shield shielding the metal plate from high frequency signals issued by the sending coil while allowing low frequency signals issuing from the sending coil to penetrate the metal plate.

9. The improvement claimed in claim 8, wherein said coils are embedded in ceramic material filling said housing.

10. The improvement claimed in claim 8, wherein said sensor further comprises said reference coil positioned within said housing, a partition within said housing separating said reference coil from said sending and receiving coils, and an inner wall lining shielding said reference coil.

11. The improvement claimed in claim 8, wherein said housing is positioned on the top side of said base plate and within the bottom side of a nozzle brick of said metallurgical vessel.

12. The improvement claimed in claim 8, wherein said housing is concentrically positioned within an aperture through said base plate.

13. The improvement claimed in claim 12, wherein said housing defines a conduit for a discharge sleeve of said metallurgical vessel.

14. The improvement claimed in claim 12, wherein said housing is integrated into a centering ring for a nozzle brick of said metallurgical vessel.

15. In a device for detecting slag flowing with a stream of molten metal discharged through an outlet opening in a metallurgical vessel, said device including a sensor for sensing slag in the stream of molten metal to be positioned in the area of a metal base plate of the metallurgical vessel and to surround the discharged stream of molten metal without being in contact therewith, said sensor having at least one sending coil and at least one receiving coil associated with a reference coil, the improvement wherein:

at least said sending and receiving coils are positioned within a housing formed of non-magnetic material, said housing encompassing said coils and including means for preventing the metal plate from adversely affecting the sensing of the slag in the molten metal when the device is positioned in the area of the metal base plate of the vessel, said means comprising one of a shield shielding the reference coil from an electromagnetic field emanating from the stream of molten metal while exposing the reference coil to an electromagnetic field emanating from the metal plate, and a shield shielding the metal plate from high frequency signals issued by the sending coil while allowing low frequency signals issuing from the sending coil to penetrate the metal plate.

16. In an assembly including a metallurgical vessel having a metal base plate and an outlet opening for discharging a stream of molten metal from said vessel, and a device for detecting slag flowing with the stream of molten metal, said device including a sensor for sensing the slag in the stream of molten metal, said sensor positioned in the area of said metal base plate and surrounding the discharged stream of molten metal without being in contact therewith, said sensor having at least one sending coil and at least one receiving coil associated with a reference coil, the improvement wherein:

at least said sending and receiving coils are positioned within a housing formed of non-magnetic material, said housing encompassing said coils and including means for preventing the metal plate from adversely affecting the sensing of the slag in the molten metal, said means comprising one of a shield shielding the reference coil from an electromagnetic field emanating from the stream of molten metal while exposing the reference coil to an electromagnetic field emanating from the metal plate, and a shield shielding the metal plate from high frequency signals issued by the sending coil while allowing low frequency signals issuing from the sending coil to penetrate the metal plate.

* * * * *